UNITED STATES PATENT OFFICE.

FREDERICK G. DOKKENWADEL, OF COSHOCTON, OHIO.

INSECTICIDE-FERTILIZER.

No. 888,148.  Specification of Letters Patent.  Patented May 19, 1908.

Application filed November 11, 1907. Serial No. 401,733.

*To all whom it may concern:*

Be it known that I, FREDERICK G. DOKKENWADEL, a citizen of the United States, and a resident of Coshocton, in the county of Coshocton and State of Ohio, have invented a certain new and useful Insecticide-Fertilizer, of which the following is a specification.

My invention relates to a novel composition of matter to be used as a fertilizer and at the same time as an insecticide, the elements of the same being so combined that the insecticidal properties increase the efficiency of the fertilizer and the fertilizing properties increase the efficiency of the insecticide. In addition to this the active agents of the composition are incorporated with a durable base of cellulose material so that, after application to the soil, both agents are gradually given off and the efficiency of the material, both as an insecticide and a fertilizer, is continued over a longer period of time than would otherwise be possible.

The cellulose with which the combined insecticide and fertilizer is incorporated may be of any variety, such as pulp fiber derived from wood, fiber, old newspapers or waste papers, or any fabric material.

The fertilizing materials may comprise any compounds or elements furnishing one or more of the four essential plant foods nitrogen, phosphoric acid, potash and lime, which, on account of locality or circumstances, it may be advisable to use. For example, nitrate of soda and sulfate of ammonia furnishing nitrogen; dissolved phosphatic rock or superphosphate, bone ash, dissolved bone black, basic slag, and dissolved phosphatic guano furnishing phosphoric acid and lime; muriate of potash, sulfate of potash, kainite, and wood ashes furnishing potash and lime.

The composition is rendered insecticidal by the addition of such ingredient or ingredients as will be most effective in destroying the insects to be combated. The materials used are such as act either as a poison or a repellent or both, for instance crude carbolic acid, kerosene oil, hellebore, crude oil, fish oil, pyrethrum powder, etc. and their use is governed by circumstances of cheapness and effectiveness.

I prefer to use a small quantity of adhesive such as glue, coal tar or like sticky substance in making my composition so as to turn out the finished product in fine granular form, but if desired the adhesive may be omitted. To make up a required bulk I may also add to the above materials a cheap filler containing any essential fertilizing agent, for instance marl, black muck, peat, etc, By way of example I give below a working formula for the manufacture of an insecticide fertilizer carrying out my invention, but I wish it distinctly understood that the ingredients used and the methods employed may be varied within wide limits and are only limited by the scope of the claims:

To make approximately one ton of my insecticide fertilizer, about 410 pounds of nitrate of soda is dissolved in enough water to make a saturated solution and 300 pounds of muriate of potash is then mixed in the solution. To this solution is then added 155 pounds of pulp fiber which absorbs the same with great facility. Then 800 pounds of dissolved phosphatic rock and 335 pounds of marl or other filler is thrown into the mass and the whole placed in a mixing machine where the ingredients are thoroughly incorporated and mixed in a homogeneous mass. The material is then passed through a drying machine. The insecticidal ingredients are sprayed on the fertilizer when it is nearly dry and a thorough impregnation takes place. If desired, any of the oily insecticides may be made into an emulsion with soap and water before being added to the fertilizer. The quantity of insecticide ingredients used per ton of fertilizer varies with the insect to be eradicated and with the quantity of fertilizer to be used per acre. In the use of kerosene and crude carbolic acid, the quantity varies from one to five gallons per ton of finished product.

The important advantage of my invention is the homogeneous mixture of the plant foods and insecticides and the thorough incorporation of this mixture with a durable base of cellulose material so that it will not be washed away by the soil drainage waters. These plant foods are gradually taken up by the plants, insuring a healthy vigorous growth and the insecticide ingredients gradually permeate the soil around the roots and fibers of the plant and thereby prevent all injury from insect attack. Other features of advantage possessed by my composition are as follows: The product will not get damp and sticky, neither will it get hard and lumpy; it contains no free acid, since the lime contained would neutralize any free acid which might be present, hence the fertilizer will not rot or eat the bags in which it is contained.

I claim:

1. A fertilizer consisting of cellulose combined with nitrates, potash and phosphates, the whole mass being impregnated with crude carbolic acid, substantially as described.

2. A fertilizer consisting of cellulose combined with nitrates, potash and phosphates, the whole mass being impregnated with crude carbolic acid and kerosene, substantially as described.

3. A fertilizer consisting of cellulose material combined with nitrate of soda, sulfate of potash and soluble phosphates, the whole mass being impregnated with crude carbolic acid, substantially as described.

4. A fertilizer consisting of cellulose material combined with nitrate of soda, sulfate of potash and soluble phosphates, the whole mass being impregnated with crude carbolic acid and kerosene, substantially as described.

FREDERICK G. DOKKENWADEL.

Witnesses:
HALSTED WAINRIGHT,
ALLEN G. MERCHANT.